US008099114B2

(12) United States Patent
Midkiff et al.

(10) Patent No.: US 8,099,114 B2
(45) Date of Patent: Jan. 17, 2012

(54) PERSONAL SHORT CODES FOR SMS

(75) Inventors: David Midkiff, Kirkland, WA (US);
Thomas J. Cast, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 887 days.

(21) Appl. No.: 11/191,561

(22) Filed: Jul. 28, 2005

(65) Prior Publication Data
US 2007/0026878 A1 Feb. 1, 2007

(51) Int. Cl.
*H04W 4/00* (2009.01)
(52) U.S. Cl. .............. 455/466; 455/404.1; 455/412.1; 455/445; 455/518; 455/519; 455/521; 370/351; 370/471
(58) Field of Classification Search .......... 455/466, 455/518, 519, 521, 404.1, 445, 412.1; 370/351, 370/471
See application file for complete search history.

(56) References Cited

U.S. PATENT DOCUMENTS

| | | | | |
|---|---|---|---|---|
| 5,835,570 A | * | 11/1998 | Wattenbarger | 379/88.03 |
| 6,175,743 B1 | * | 1/2001 | Alperovich et al. | 455/466 |
| 6,292,669 B1 | * | 9/2001 | Meuronen et al. | 455/466 |
| 6,658,260 B2 | * | 12/2003 | Knotts | 455/466 |
| 6,856,809 B2 | * | 2/2005 | Fostick | 455/466 |
| 6,888,823 B1 | | 5/2005 | Zaffino | 370/354 |
| 6,956,831 B1 | * | 10/2005 | Mahr | 370/310 |
| 7,110,780 B2 | * | 9/2006 | Bantukul et al. | 455/466 |
| 7,120,455 B1 | * | 10/2006 | Chen et al. | 455/466 |
| 7,460,873 B2 | * | 12/2008 | Lovell et al. | 455/466 |
| 8,019,362 B2 | * | 9/2011 | Sweatman et al. | 455/466 |
| 2004/0142707 A1 | | 7/2004 | Midkiff et al. | 455/466 |
| 2005/0003837 A1 | | 1/2005 | Midkiff et al. | 455/466 |
| 2005/0260993 A1 | * | 11/2005 | Lovell | 455/445 |
| 2007/0066328 A1 | * | 3/2007 | Sweatman et al. | 455/466 |
| 2007/0287484 A1 | * | 12/2007 | Chava et al. | 455/466 |

* cited by examiner

*Primary Examiner* — Olumide T Ajibade Akonai
(74) *Attorney, Agent, or Firm* — Woodcock Washburn LLP

(57) ABSTRACT

Personal short codes facilitate the establishment of unique, personalized codes for accessing network services and personalized distribution lists. Users can create individualized lists of personal short codes for desired network services. Services can reside within or outside of the wireless network. Messages having personal short codes can incorporate text routing capabilities to provide routing based on the text of a message. PSCs can be of any length or combination of alpha-numeric characters. Personal short codes can be entered via a mobile device, such as a mobile telephone, PDA, or laptop, or via a web browser.

19 Claims, 10 Drawing Sheets

PERSONAL SHORT CODES FOR SMS

TECHNICAL FIELD

The technical field relates generally to text messaging in telephone messaging networks and wireless mobile telephone networks, and more specifically to personal short codes for use with the Short Message Service (SMS).

BACKGROUND

Mobile communication systems provide a variety of services. Many of these services are obtained via text messaging. Text messaging allows a subscriber access to various services via wireless networks and the Internet. Example services include sending an alphanumeric message to a recipient and obtaining a weather report for a geographic location.

In many commercial systems, text messaging is implemented in accordance with the well known Short Message Service (SMS). SMS supports transmission of alphanumeric messages between mobile devices or entities, such as mobile telephone, for example. SMS allows for transmission of alphanumeric messages containing up to 160 characters. A subscriber typically enters a text message on a keyboard of a mobile device, such as a mobile telephone, a PDA, or other hand-held device. Keyboards on most mobile devices are small. Combining this with the possibility of typing a 160 character message does not guarantee a pleasurable experience. Also, because of the plethora of available services, remembering the exact alphanumeric code of a particular service can be difficult.

SUMMARY

Personal short codes (PSCs) for use with the Short Message Service (SMS) provide subscribers the capability to establish unique, personalized codes for accessing network services. Subscribers can create individualized lists of PSCs for desired network services. These services can reside within or outside of the wireless network, (e.g., Internet services). PSCs also provide subscribers the capability to establish personalized distribution lists for network services. In addition, PSCs can incorporate text routing capabilities to provide routing based on the text of a message. PSCs can be of any length or combination of alphanumeric characters.

In operation, it is envisioned that a subscriber enters a PSC on her mobile unit, which sends an associated mobile originated SMS message to the PSC associated address. The message is received by a message center (MC) and routed to a Short Message Delivery Point to Point Gateway (SG). The SG, utilizing the originating mobile directory number (MDN), checks the directory server (SD) to determine if the subscriber has PSCs. If the subscriber has PSC service, according to the subscriber's profile at the SD, the message is routed to the PSC server. The PSC server then applies the PSC service or delivers the message to the appropriate destinations.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

Figure 1:
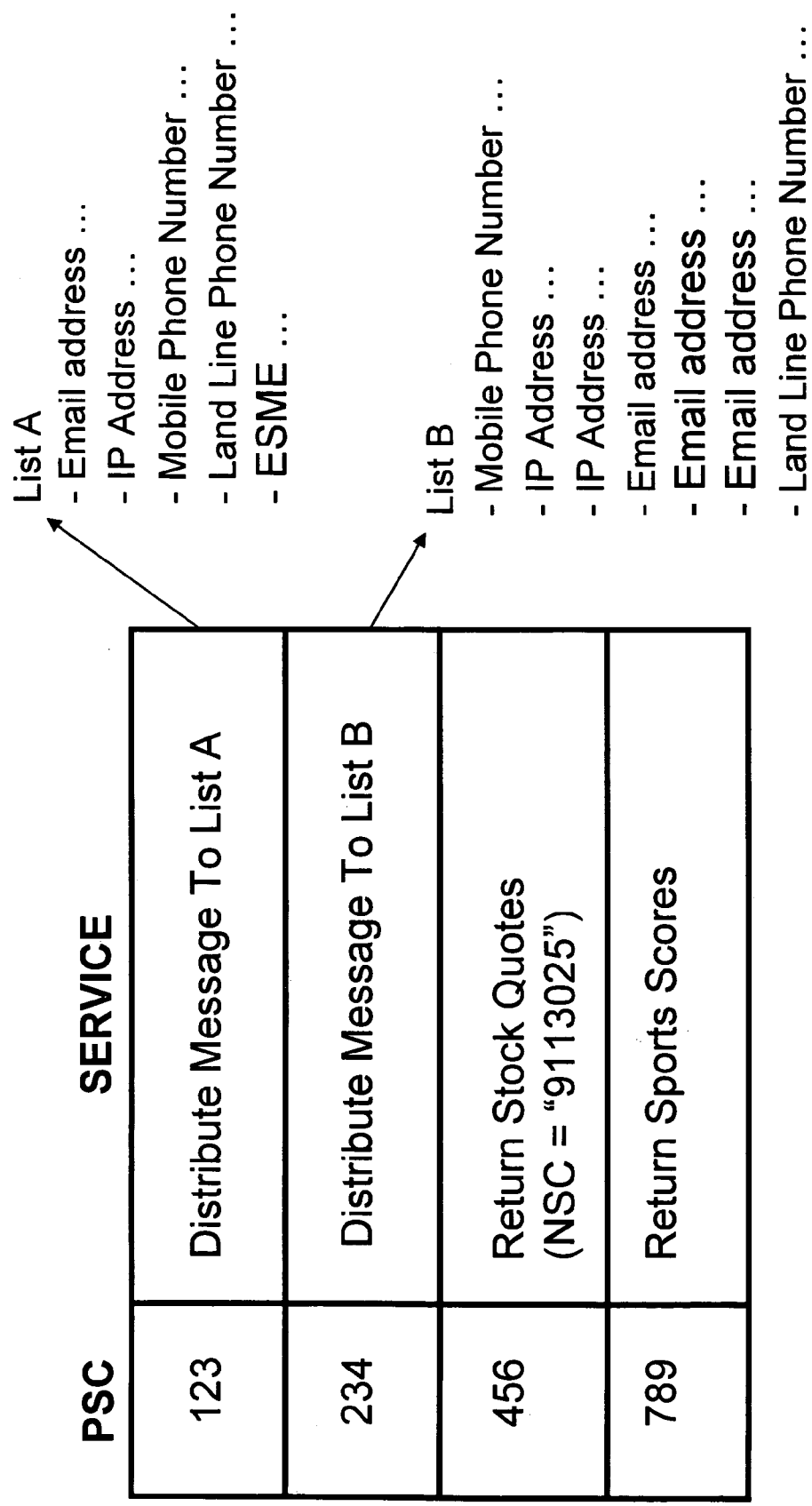
FIG. 1 is a chart depicting various exemplary Personal short codes (PSCs)

FIG. 1 is a chart depicting various exemplary Personal short codes (PSCs). PSCs allow subscribers simplified access to services using SMS short codes. Subscribers can define unique PSCs and the services accessed by each PSC. PSCs provide access to services both within and outside of (e.g., the Internet) wireless networks. For example, as shown in FIG. 1, a subscriber can define a PSC of "123" to send a message (message not shown in FIG. 1) to a first distribution list (List A), a PSC of "234" to send a message (not necessarily the same message as the message associated with PSC "123") to a second distribution list (List B), a PSC of "456" to return stock quotas, and a PSC of "789" to return sports scores. Although the PSCs depicted in FIG. 1 are three numeric digits, PSCs are not limited thereto. PSCs can comprise any number of alphanumeric characters (letters and/or numbers). However limitations can be imposed by the network or system in which PSC are utilized. For example, a system may limit PSC to numbers only, and may limit the string of numbers to a variable length between 2 and 16 digits. The distribution lists, e.g., lists A and B, can be of any length and can contain various types of destinations that can be accommodated by the network. For example, a system may limit a destination address to a mobile phone number or an e-mail address.

Messages are distributed to the destinations in the distribution lists. For example, as depicted in FIG. 1, distribution list A includes an email address, and IP address to the Internet, a mobile phone number, a land line phone number, and an address to an external short message entity (ESME). An ESME is a subscriber service external to the wireless network. Thus, simply by entering the PSC "123," a subscriber can send a message, such as "See you at tonight's football game" to the destinations contained in distribution list A. Further, this same message could be used to obtain sports scores. Assuming one of the subscribed services is obtaining sports scores, the application accessed by the ESME can recognized the word "football" in the message and provide football scores to the subscriber in response to receiving the PSC "123." The message associated with each distribution can vary, thus the message sent by PSC "234" can be the same or can differ from the message of PSC "123." The distribution lists can vary as to the number of destinations in the list and type of destination. Another exemplary distribution list is depicted by list B of FIG. 1.

Each of PSCs "456" and "789" is indicative of a network short code (NSC). For example, a NSC for returning stock quotes could be "9113025." Utilizing PSCs however, a subscriber can assign this NSC the PSC "456" as depicted in FIG. 1. Thus, the PSC "456" is indicative of the NSC "9113025." Therefore, PSCs can be indicative of network short codes, a distribution lists, or a combination thereof.

Figure 2:
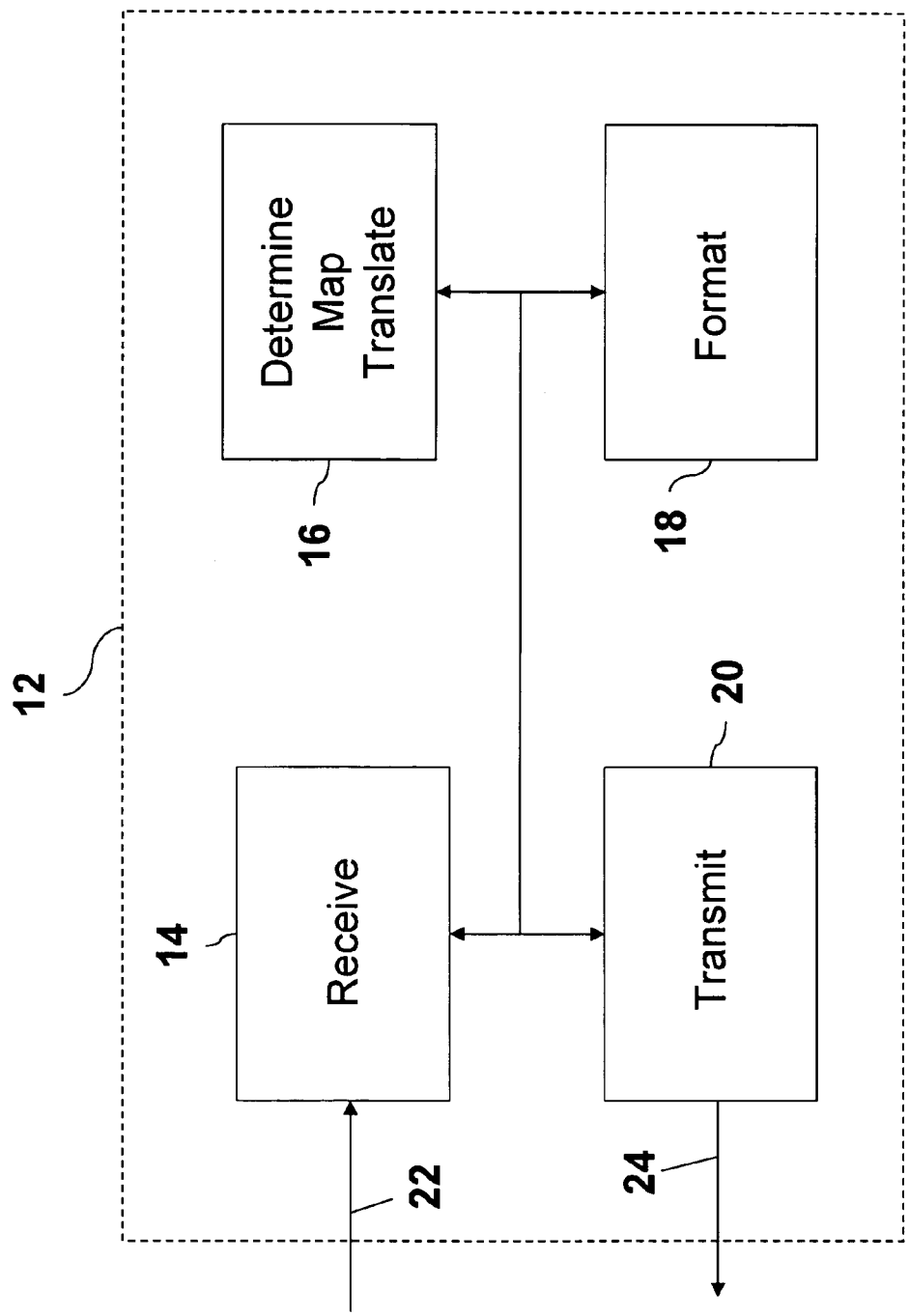
FIG. 2 is an exemplary functional block diagram of a PSC processor.

FIG. 2 is an exemplary functional block diagram of a PSC processor 12 for routing messages via a network. It is emphasized that the functional block diagram depicted in FIG. 2 is exemplary and not intended to imply a specific implementation. Thus, the PSC processor 12 can be implemented in a single processor, such as a computer, or multiple processors. Multiple processors can be distributed or centrally located. Multiple processors can communicate wirelessly, via hard wire, or a combination thereof. For example, each portion of the PSC processor 12 can be implemented via multiple distributed processors.

The PSC processor 12 comprises a receiving portion 14, a determining/mapping/translating (DMT) portion 16, a formatting portion 18, and a transmitting portion 20. The receiving portion 14 receives a message having a PSC contained therein. As described in more detail below, a message comprises a source address, the PSC, and an optional text message. The PSC comprises the destination address for the message. In an exemplary embodiment, the source address is a mobile station integrated services directory number (MSISDN), i.e., the originator's phone number. The message is received via interface 22, which can be a wireless link, a hardwired interface, or a combination thereof. For example, the message can be mobile originated (MO) message from a subscriber's mobile phone, and the message can be routed to the receiving portion 14 of the PSC processor 12 via a gateway server of a wireless communications network. The received message comprises a PSC which is indicative of either a network short code (NSC) or a distribution list.

The DMT portion 16 determines if the PSC of the received message is indicative of a NSC or a distribution list. If the received message comprises a PSC indicative of a NSC, the DMT portion 16 checks the subscriber data profile to determine if the subscriber has PSCs and if the PSC is associated with a NSC. If the subscriber has PSCs and the PSC is associated with a NSC, the PSC is translated to the network short code. For example, using the PSC/NSC association shown in FIG. 1, the PSC "456" is mapped to the NSC "9113025." Note, that at this point, the association between each PSC and a corresponding NSC is predetermined because the subscriber has already created the PSCs. Thus, the DMT portion 16 has therein a list of PSCs and associated NSCs. The formatting portion 18 replaces the PSC with the associated NSC, e.g., replace "456" with "9113025." The transformed message (the message containing the NSC in place of the PSC) is transmitted by transmitting portion 20 via an interface 24. The interface 24 can be wireless, hardwired, or a combination thereof. For example, the transformed message can be wirelessly transmitted to a gateway server of a wireless communications network.

If the DMT portion 16 determines that the PSC of the received message is indicative of a distribution list, the DMT portion 16 maps the PSC to the associated distribution list. The message portion (e.g., "See you at tonight's football game") of the received message is transmitted via the interface 24 by the transmitting portion 20 for routing to the intended destinations on the distribution list. When a subscriber establishes a PSC indicative of a distribution list, it is envisioned that the subscriber also will generate a message to be routed to the destinations on the distribution list. However, this is not necessary. That is, a subscriber is not prevented from establishing a PSC indicative of a distribution list without an associated message.

Mobile telephone messaging networks have been integrated with data applications in accordance with an industry standard known as the Short Message Peer to Peer (SMPP) messaging protocol. SMS messages are routed between a mobile telephone messaging network and different SMS data applications via an SMPP gateway (SG). An SMPP Gateway Text Router (SGTR) routes SMS text messages using SMPP protocol based on text keywords within the text message. A subscriber can send a message to a destination address or number and request information. The SGTR analyzes the content of the message and routes the message to a server that will respond with the information requested by the subscriber. For example, a subscriber can send a message to 789 with the following text message "football score for Seahawks." The message is routed to the SGTR based on the 789 address. The SGTR interprets the text message and then routes the message to a server, such as an ESME, that can send the Seahawk's scores to the subscriber. The server (e.g., ESME) can then send the requested information to the subscriber's phone. Thus, any message that contains appropriate text keywords can be routed to applications that return some type of information or take some type of action based on a subscriber's request.

Figure 3:
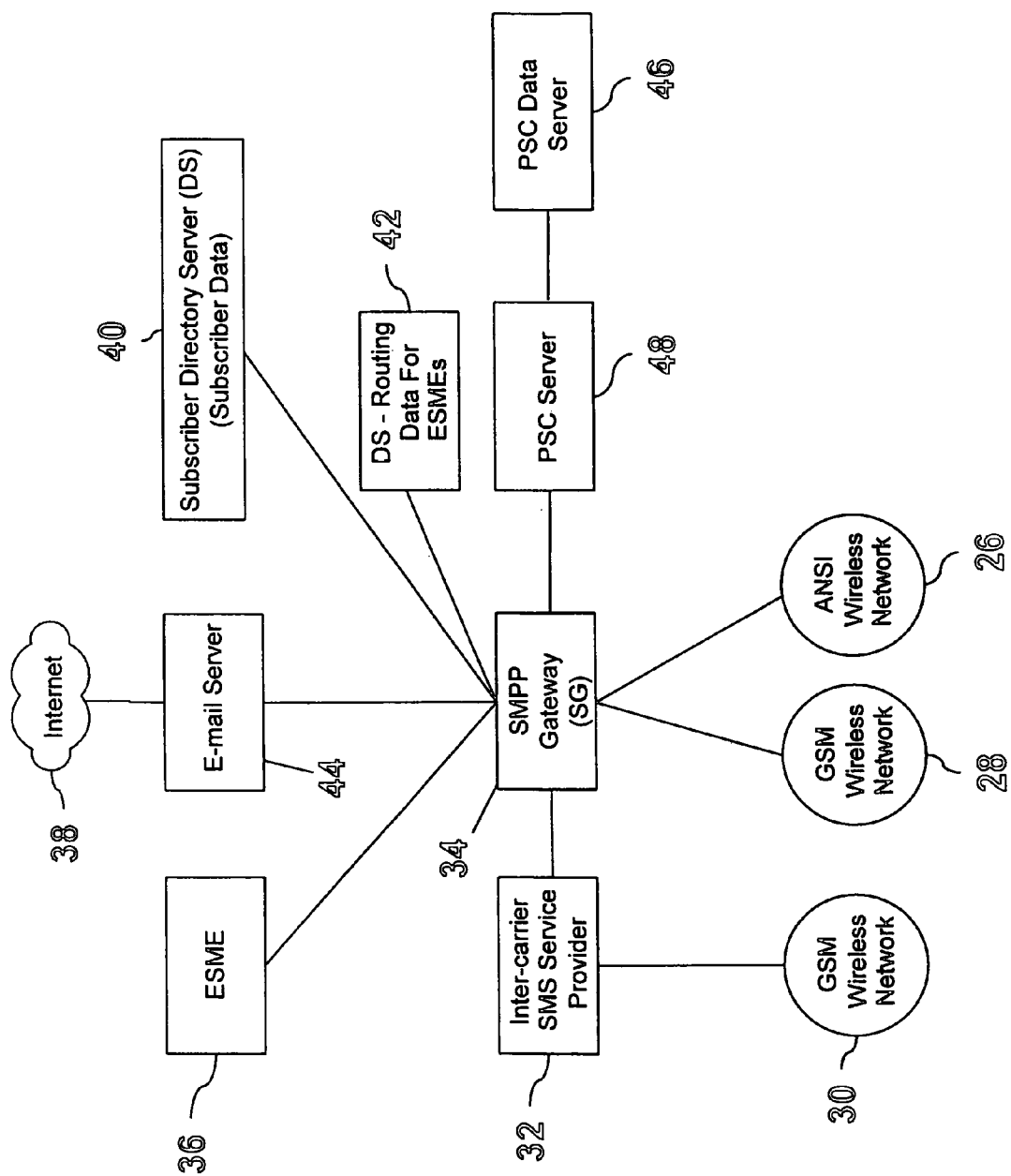
FIG. 3 is a depiction of an exemplary architecture for implementing PSCs.

FIG. 3 depicts an exemplary architecture for implementing PSCs utilizing SMS. Various wireless networks communicate with the SG 34. These wireless networks include ANSI (American National Standards Institute) wireless network 26, GSM (Global System for Mobile Communications) wireless network 28, and GSM wireless network 30. The GSM wireless network 30 is coupled to the SG 34 via the inter-carrier SMS service provider 32. The GSM wireless network 30 represents an external network, such as another carrier's network for example. The depicted wireless networks are exemplary. Any number and type of wireless network can be included in the architecture (e.g., GSM, ANSI, CDMA, IDeN). Further, the wireless networks can comprise various components such as message centers, mobile switching centers, specific wireless networks and compatible mobile terminals, number portability databases, for example. The GSM wireless network 28 and the ANSI wireless network 26 communicate directly with the SG 34. The GSM wireless network 30 communicates with the SG 34 via the inter-carrier SMS service provider 32. Note that for SMS purposes, the GSM wireless network 28 can communicate with the SG 34 via the inter-carrier SMS service provider 32 if the GSM wireless network 28 is not in direct communication with the SG 34. Communication with the SG 34 can be by any appropriate means, such as SMPP (TCP/IP) communications and signaling system 7 (SS7)/ANSI-41 communications, for example.

The SG 34 communicates with the PSC server 48. The SG 34 communicates with PSC data server 46 via the PSC server 48. The SG 34 also communicates with email server 44 and ESME 36. Internet 38 is accessible to SG 34 via email server 44. In an exemplary implementation, the subscriber directory server (DS) 40 and routing data server 42 are accessed using a lightweight directory access protocol, by SG 34 and email server 44.

In an exemplary scenario, a subscriber in either of the GSM wireless networks 28, 30, or the ANSI wireless network 26 sends an MO message. The MO message contains a three-digit short code "123," message content "See you at tonight's football game," and a destination address (DA). The PSC 123 has already been established by the subscriber and has an associated distribution list containing an email address, and IP address, and an address to an ESME for obtaining football scores. The MO message is received at a message center (MC) of the network in which the subscriber is located (MC not shown in FIG. 3). The MC routes the message to the SG 34. The SG 34 analyzes the DA of the message and routes the message to the PSC server 48.

The PSC server 48 in conjunction with the PSC data server 46:(1) route the message "See you at tonight's football game" to the email address on the distribution list via the SG 34 and the email server 44, (2) route the message "See you at tonight's football game" to the IP address on the distribution list via the SG 34, the email server 44, and the Internet 38, and (3) analyzes the text of the message "See you at tonight's football game." The word football is detected, and the PSC server 48 routes, via the SG 34, an appropriate request to either the routing data server 42 or the ESME 36 (which ever is appropriate) to obtain football scores and send the results to the originating subscriber. The results are routed to the subscriber via the SG 34.

Figure 4:
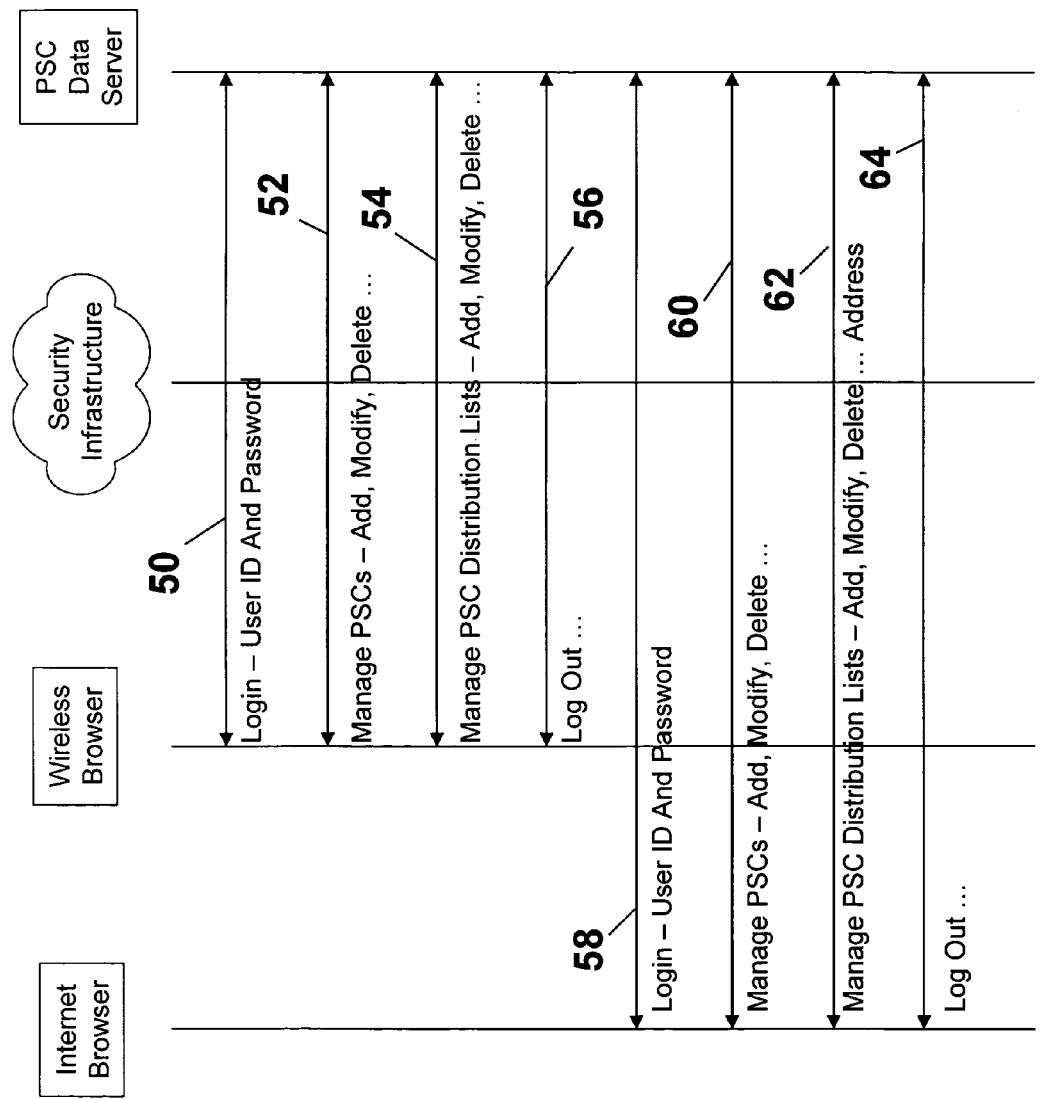
FIG. 4 is a sequential flow diagram depicting an exemplary sequence of events for managing PSCs.

FIG. 4 is a sequential flow diagram depicting an exemplary sequence of events for managing PSCs. A subscriber (user) can manage PSCs via a wireless browser of via an Internet browser. Examples of each of these two scenarios are depicted in FIG. 4. A subscriber (user) logs in by entering a user ID and password via a wireless browser (step 50) or via an Internet browser (step 58). Although not specifically depicted as an event, a subscriber can be authentication via any appropriate authentication procedure and security infrastructure (depicted by security infrastructure cloud in FIG. 4). The log in procedure is conducted from the subscriber's point of origin (i.e., wireless browser or Internet browser) and the PSC data server. The PSC data server validates the subscriber and sends acknowledge of validation, or invalidation, back to the point of origin. Once validated, the subscriber can manage her PSCs from the wireless browser (step 52) or the Internet browser (step 60). Managing PSCs includes creating, adding, deleting, and/or modifying PSCs. Similarly, PSC distribution list can be managed by the subscriber (steps 54, 62). At the conclusion of managing PSCs and/or PSC distribution lists, the subscriber logs out (steps 56, 64).

Figure 5:
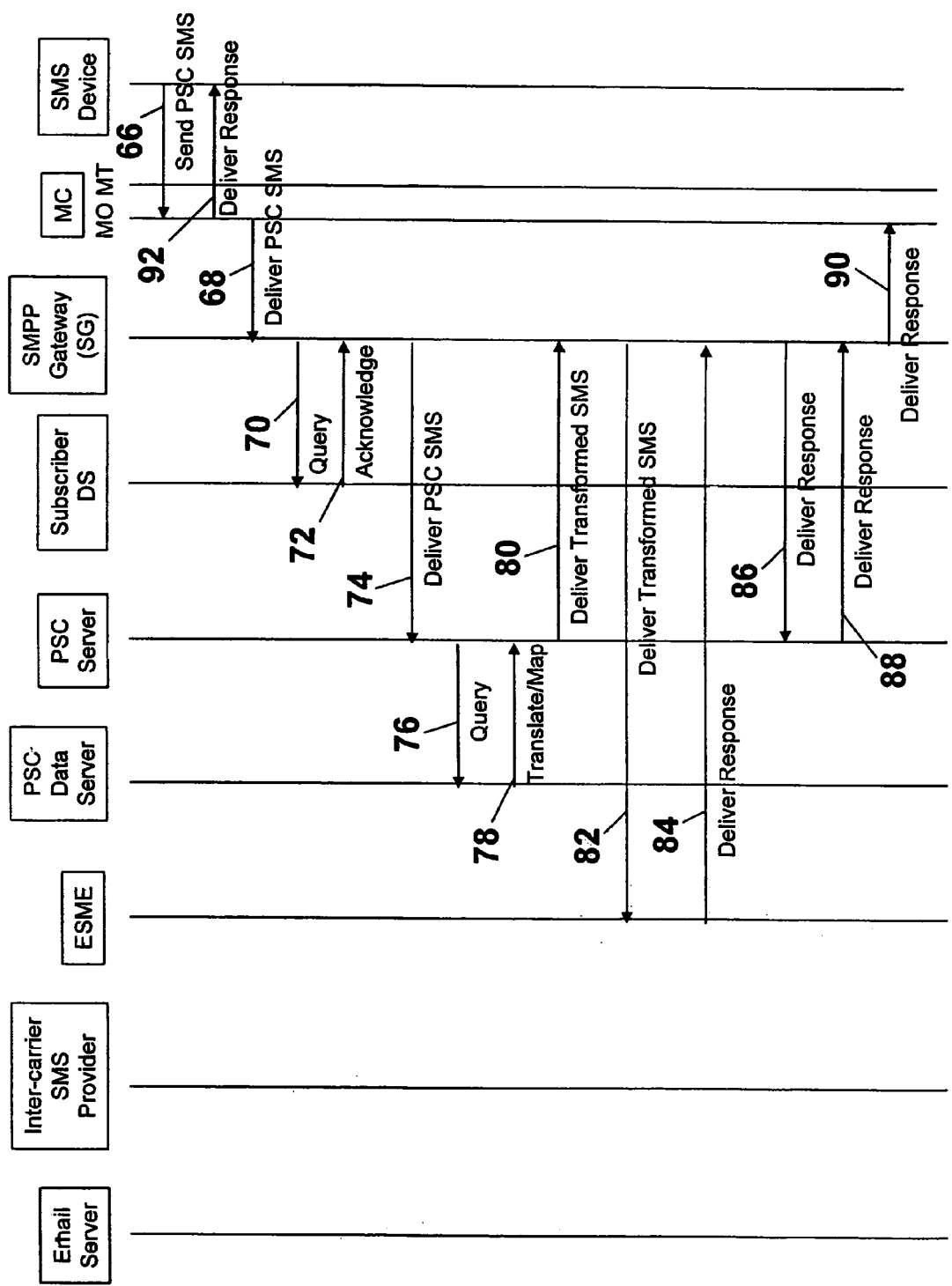
FIG. 5 is a sequential flow diagram of an exemplary sequence of events for translating PSCs to network short codes (NSCs)

FIG. 5 is a sequential flow diagram of an exemplary sequence of events for translating PSCs to network short codes (NSCs). The message is sent from the SMS device (e.g., mobile phone, PDA, laptop) to the message center (MC) of the wireless network in which the SMS device is located (step 66). The message contains a PSC, which is the destination address (DA). The message is sent from the MC as a mobile originated (MO) message to the SG at step 68. The SG analyzes the PSC/DA of the message and accordingly routes the message to the subscriber directory server (DS) at step 70. In an exemplary embodiment, the SG sends a lightweight directory access protocol (LDAP) query containing the phone number (MSISDN or MDN) to the DS. The message itself is not sent. The query essentially requests all information about the subscriber's messaging services. The query is routed to the subscriber DS to query the subscriber DS if the originating mobile station integrated services directory number (MSISDN), e.g., phone number, has at least one associated PSC.

In an exemplary embodiment, an indicator is contained in the DS. The indicator is used to determine if the subscriber has PSC service. The PSC is stored in the PSC data server. In this scenario, the subscriber profile does contain at least one PSC, and acknowledgement of this is back to the SG at step 72. The message is routed from the SG to the PSC server at step 74. The PSC server sends the PSC to the PSC data server querying the PSC data server for the NSC corresponding to the PSC at step 76. The data contained in the PSC data server includes the subscriber's MSISDN and the PSC to NSC mapping. The PSC data server maps the PSC to the corresponding NSC and sends the corresponding NSC to the PSC server at step 78. The PSC server transforms the message by replacing the PSC with the corresponding NSC. The transformed message is routed to the SG at step 80. The SG analyzes the transformed message and routes the transformed message to the appropriate ESME at step 82. The ESME (and possibly other entities) performs the requested function(s) and routes the response back to the SG at step 84. The SG routes the response to the PSC server at step 86. The PSC server routes the response to the SMS device via the SG and the MC at steps 88, 90, and 92. Note, that in the exemplary embodiment depicted in FIG. 5, step 92 occurs when the MC receives the message, between steps 66 and 68. This acknowledgement indicates that the network received the message, not that the message was delivered to the users intended destination. Step 90 indicates the status of message delivery to the MC. The MC can then send an SMS delivery receipt (if requested by the user when message is sent) to the device.

Figure 6:
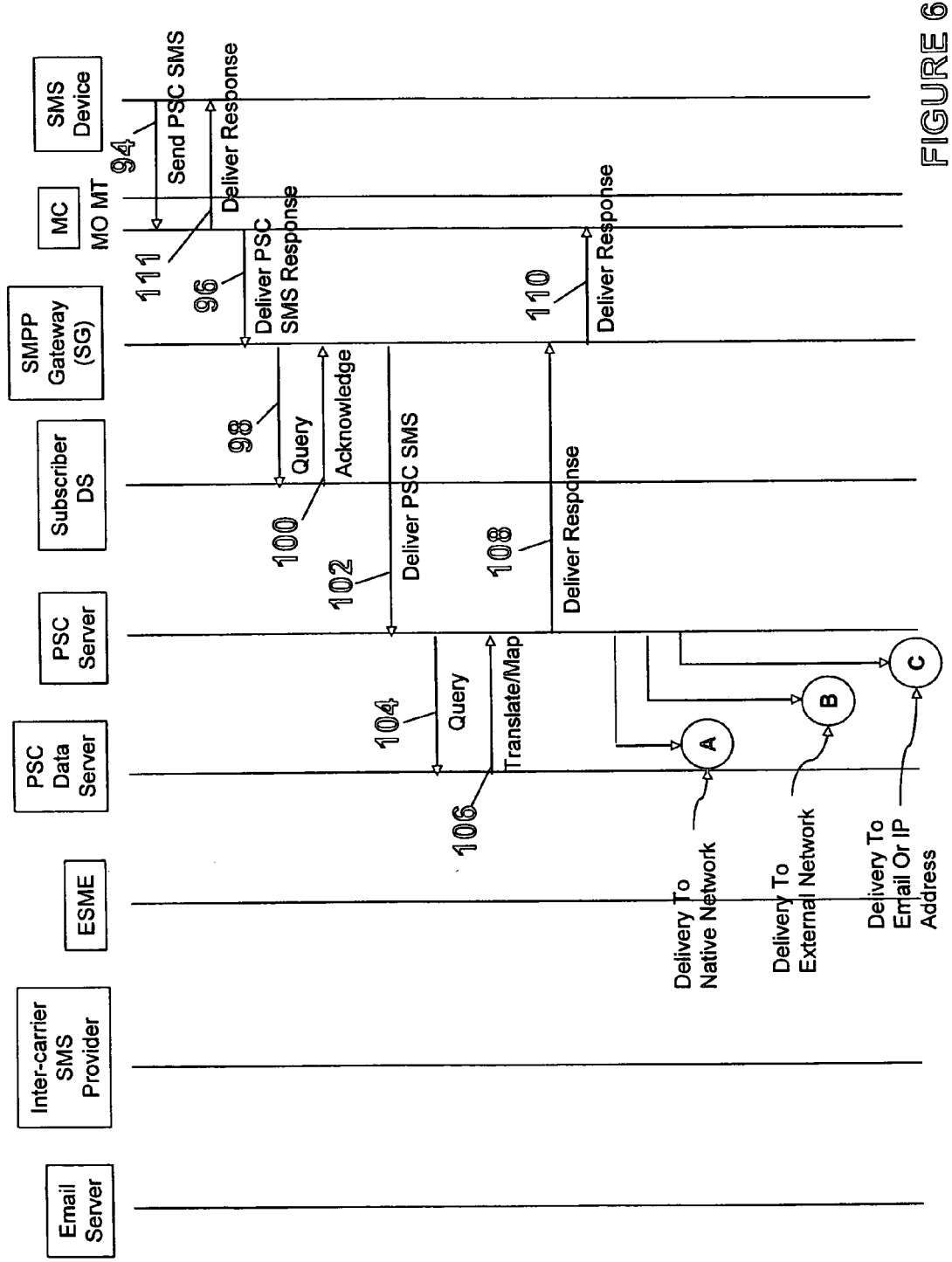
FIG. 6 is a sequential flow diagram of an exemplary sequence of events for routing a message using a PSC to a destination on a distribution list.

FIG. 6 is a sequential flow diagram of an exemplary sequence of events for routing a message using a PSC to a destination on a distribution list. In the exemplary scenario depicted in FIG. 6, a message contains a PSC indicative of a distribution list, a DA, and a message to be sent to the destinations in the distribution list. The first several steps are similar to the first several steps as depicted in the sequence of events for translating a PSC to an NSC. That is, the message is sent from the SMS device to the MC of the wireless network in which the SMS device is located (step 94). The message contains a PSC and a DA. The message is sent from the MC as an MO message to the SG at step 96. The SG analyzes the DA of the message and accordingly routes the query (e.g., LDAP query) to the subscriber DS at step 98. The message is routed to the subscriber DS to query the subscriber DS if the originating MSISDN has at least one associated PSC. The subscriber DS checks the subscriber profile to determine if the profile contains a PSC. In this scenario, the subscriber profile does contain at least one PSC, and acknowledgement of this is back to the SG at step 100. The message is routed from the SG to the PSC server at step 102. The PSC server sends the PSC to the PSC data server querying the PSC data server for the distribution list corresponding to the PSC at step 104. The data contained in the PSC data server includes the subscriber's MSISDN, the PSC to distribution list mapping, native MSISDNs on the distribution list, inter-carrier MSISDNs on the distribution list, and email addresses on the distribution list. The PSC data server maps the PSC to the corresponding distribution list and sends the corresponding distribution list to the PSC server at step 106.

The PSC server routes the response to the SMS device via the SG and the MC at steps 108, 110, and 111. Note, that in the exemplary embodiment depicted in FIG. 6, step 111 occurs when the MC receives the message, between steps 94 and 96. This acknowledgement indicates that the network received the message, not that the message was delivered to the users intended destination. At step 108 the PSC server sends a delivery response to the SG indicating the message was received and processed at the PSC. At step 109 the SG send a delivery response to the MC indicating the message was delivered to the PSC server. At this point the PSC server executes the distribution list. If the destination address from the distribution list is an MSISDN, then the message is formatted and sent as an SMS to the SG, as depicted in items A and B. If the destination address, from the distribution list is an e-mail address, the message is formatted and sent as an e-mail message, as depicted in item C. The SG routes a response to the originating SMS device indicating for each destination on the distribution list, indicating that the message was delivered. This response is routed to the SMS device via the MC at step 110. The destinations on the each distribution list can be an address within the native wireless network, an address in an external wireless network, an email address, or an IP address (messages are routed to an IP via an email server). These types of message deliveries are depicted in other diagrams as indicated in FIG. 6.

Figure 7:
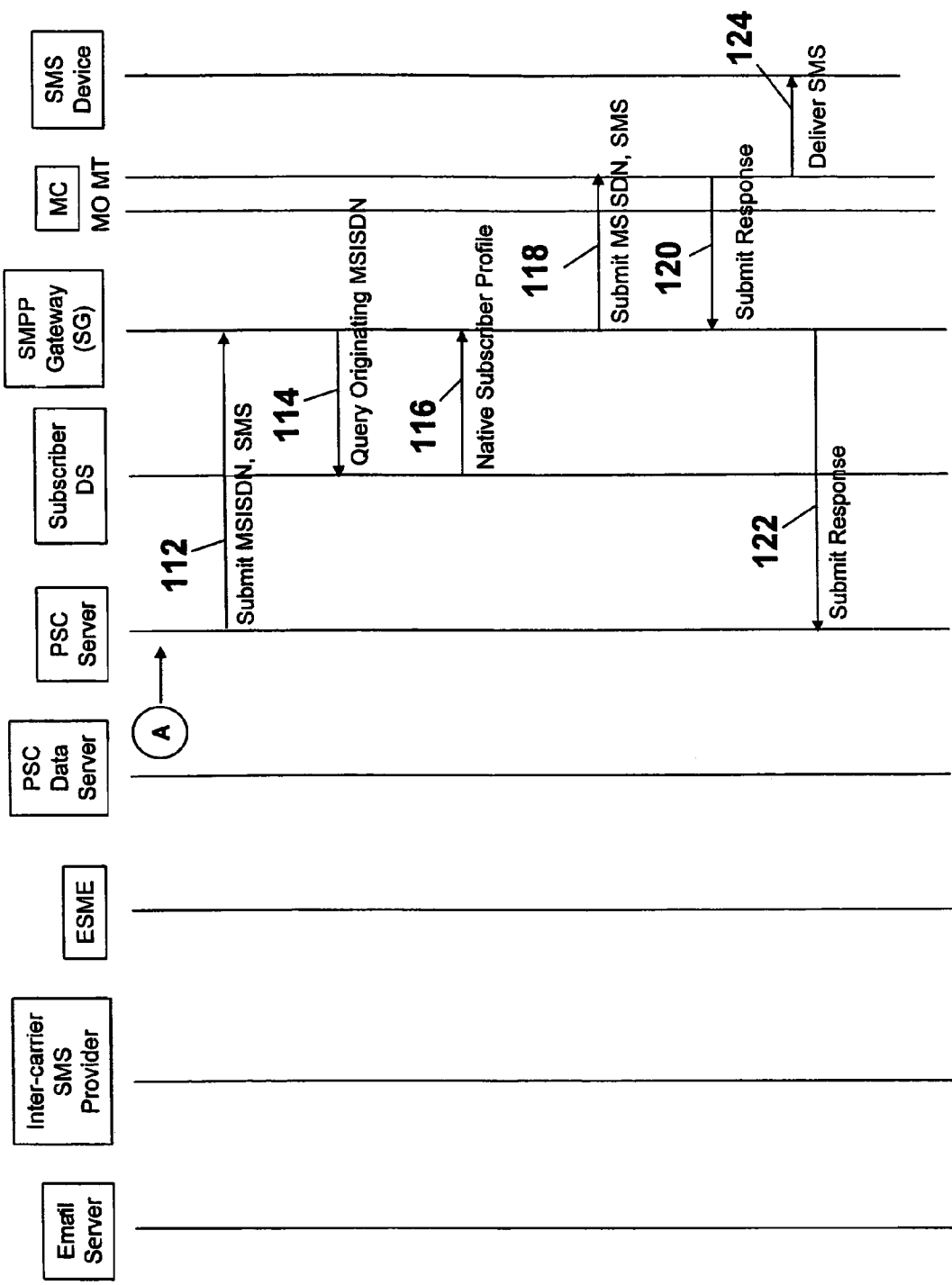
FIG. 7 is a sequential flow diagram of an exemplary sequence of events for routing a message using a PSC to a destination on a distribution list, wherein the intended destination of the message is to a subscriber in the native network.

FIG. 7 is a sequential flow diagram of an exemplary sequence of events for routing a message using a PSC to a destination on a distribution list, wherein the intended destination of the message is to a subscriber in the native network. Starting from the PSC server, the MSISDN and the SMS are submitted to the SG at step 112. The SG queries the subscriber DS for the subscriber profile at step 114. The subscriber DS sends the subscriber profile to the SG at step 116. The SG submits the SMS and the MSISDN to the MC at step 118. A response indicating that the message was delivered to the destination on the distribution list is sent to the SG from the MC at step 120. The SMS is delivered to the intended SMS device from the MC at step 124. A response indicating that the message was delivered to the destination on the distribution list is sent from the SG to the PSC server at step 122.

Figure 8:
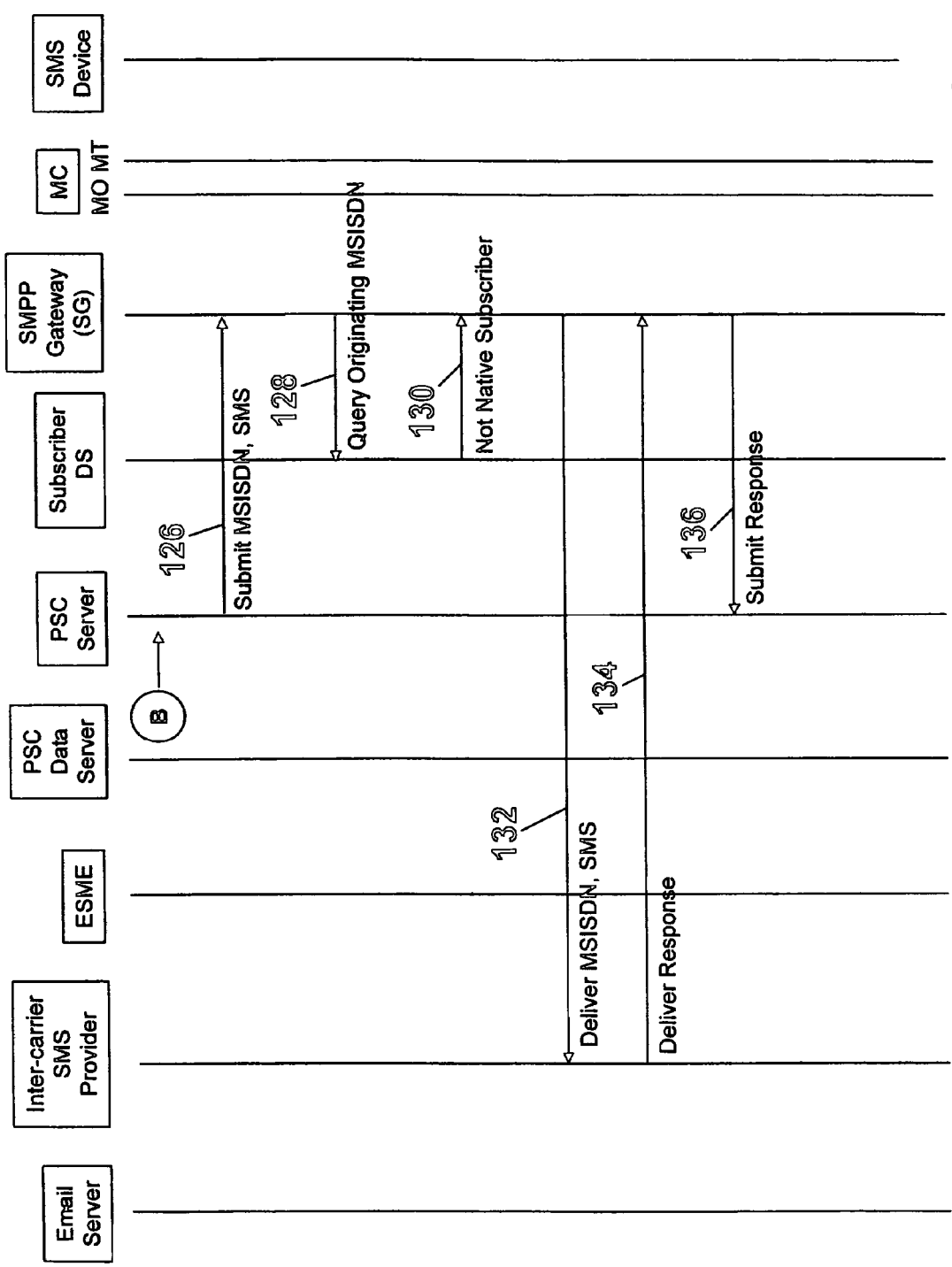
FIG. 8 is a sequential flow diagram of an exemplary sequence of events for routing a message using a PSC to a destination on a distribution list, wherein the intended destination of the message is to a subscriber in an external network.

FIG. 8 is a sequential flow diagram of an exemplary sequence of events for routing a message using a PSC to a destination on a distribution list, wherein the intended destination of the message is to a subscriber in an external network. Starting from the PSC server, the MSISDN and the SMS are submitted to the SG at step 126. The SG queries the subscriber DS for the subscriber profile at step 128. The subscriber DS determines that the queried MSISDN is of an external subscriber sends an appropriate response to the SG at step 130. The SG sends the SMS and the MSISDN to the inter-carrier SMS provider at step 132. The message then is routed to the appropriate destination (this sequence of events not shown in FIG. 8). A response indicating that the message was delivered to the destination on the distribution list is sent to the SG from the inter-carrier SMS provider at step 134. A response indicating that the message was delivered to the destination on the distribution list is submitted from the SG to the PSC server at step 136.

Figure 9:
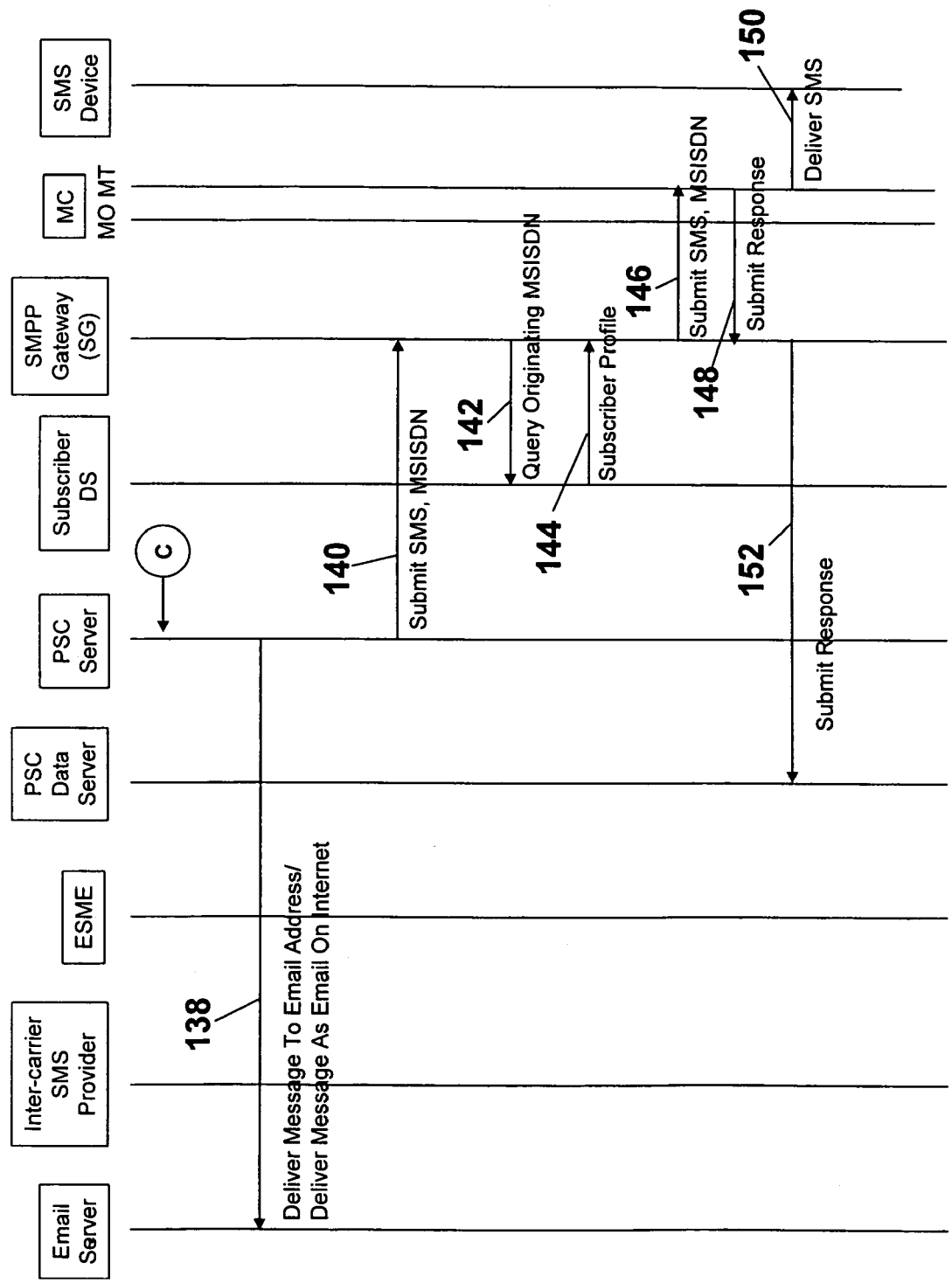
FIG. 9 is a sequential flow diagram of an exemplary sequence of events for routing a message using a PSC to a destination on a distribution list, wherein the intended destination of the message is an email address or an IP address.

FIG. 9 is a sequential flow diagram of an exemplary sequence of events for routing a message using a PSC to a destination on a distribution list, wherein the intended destination of the message is an email address or an IP address. Starting at the PSC server, the message is delivered to the email address (which can eventually be delivered to an IP address) via the email server at step 138. Step 138 is repeated until the message has been delivered to all email/IP addresses on the distribution list. After the message is sent to all the email addresses on the distribution list, an SMS is sent to the originating subscriber indicating that messages have been sent to all email/IP addresses on the distribution list. The message to the originating subscriber is sent after the message has been sent to all the destinations on the distribution list. This includes both SMS and e-mail addresses. Thus, the SMS and MSISDN are sent from the PSC server to the SG at step 140.

The SG queries the originating MSISDN in the subscriber DS for the subscriber profile at step 142. The subscriber DS sends the subscriber profile to the SG at step 144. The SG sends the SMS and the MSISDN to the MC at step 146. The MC sends a response to the SG indicating that the message was sent to the SMS device at step 148. The response indicates that the MC accepted the message for delivery, not that it actually reached the device. For example, the device may be powered off or out of coverage, thus the message it not delivered instantly. The MC stores the message until the device is reachable then delivers the message to the device. The message indicating the all email addresses and SMS addresses (MSISDNs) on the distribution list were sent messages is sent to the SMS device from the MC at step 150. A response indicating that the message was sent to the originating subscriber and that all email/IP addresses on the distribution list have been sent messages is sent to the PSC server at step 152.

Figure 10:
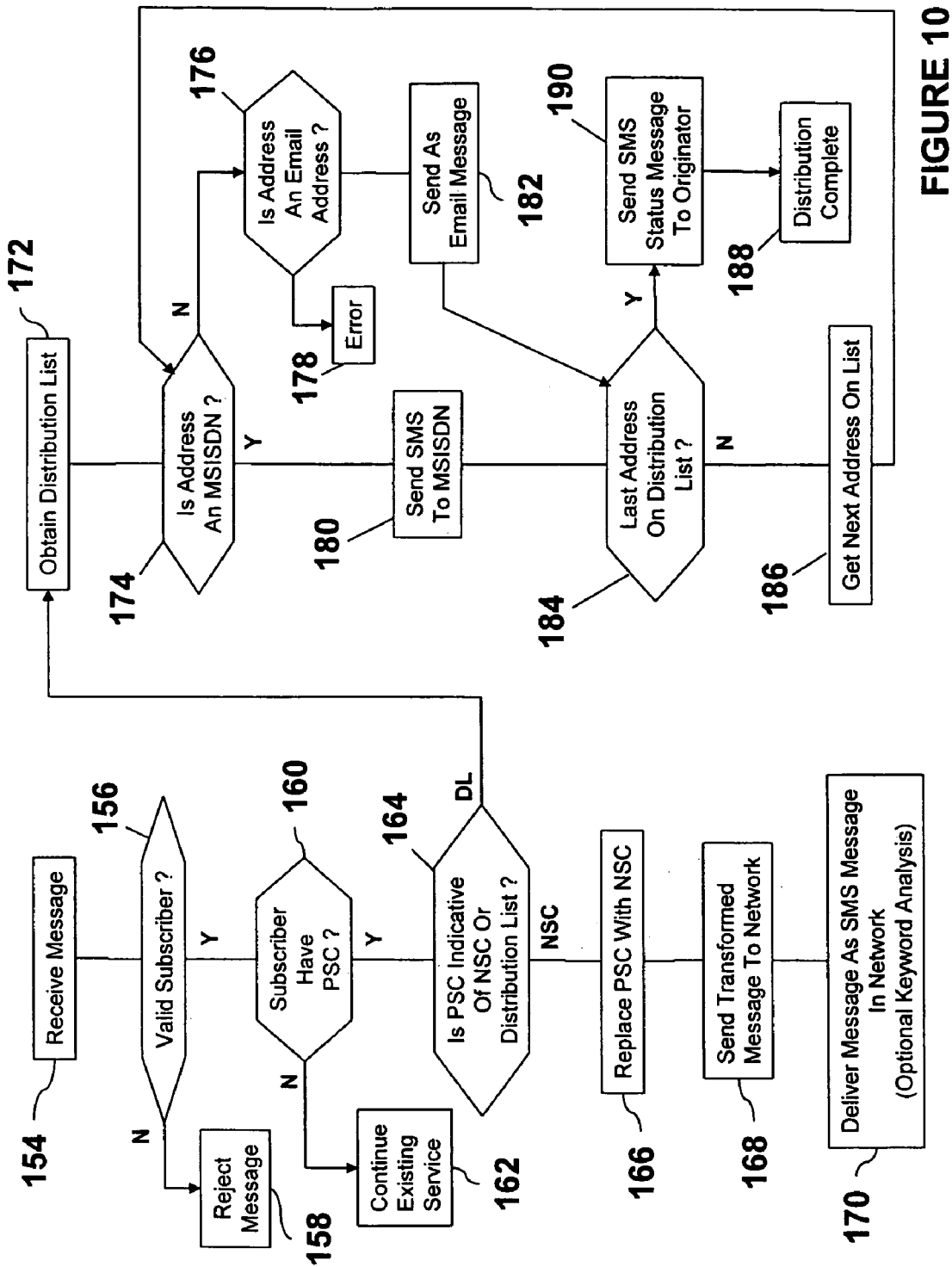
FIG. 10 is a flow diagram of an exemplary process for routing a message via a network utilizing a PSC.

FIG. 10 is a flow diagram of an exemplary process for routing a message via a network utilizing a PSC. At step 154, the message is received. The message can be an MO message or any appropriately formatted message. The message is analyzed to determine if the subscriber is valid at step 156. Step 156 is optional. That is, PSCs are utilizable to route messages via a network whether the originator is a valid subscriber or not. However, subscriber validation is commonly used to facilitate payment for routing a message. As depicted in the exemplary process of FIG. 10, if the subscriber is not valid, the message is rejected at step 158. If the subscriber is valid (step 156), it is determined if the message comprises a PSC at step 160. If it is determined that the message does not contain a PSC (step 160), the message is processed in accordance with the existing service without utilizing PSCs. If the message is determined to contain a PSC (step 160), the message is analyzed to determine if the PSC is indicative of an NSC or a distribution list (DL) at step 164. If the PSC is indicative of an NSC, the PSC is replaced by the NSC at step 166. The transformed message (i.e., message containing the NSC place of the PSC) is routed to the network at step 168 and delivered as an SMS message at step 170. As described above, if the message is being routed to an ESME, for example, to access a service, service applicable keywords in the message can be utilized to access the service.

If, at step 164, it is determined that the PSC is indicative of a distribution list, the distribution list is obtained or accessed at step 172. The first address on the list is analyzed to determine if it is a mobile station integrated services directory number (MSISDN) at step 174. If the address is an MSISDN, the SMS message is sent to the MSISDN at step 180. The distribution list is analyzed to determine if more addresses exist at step 184. If no addresses remaining, an SMS message is sent to the originator indicating that the message was sent to the address on the list at step 190. The status message to the originator can be sent only once after all messages (including SMS and email) are sent or after each message is sent. It is envisioned that this could be a subscriber configuration option. The message distribution process is completed at step 188. If more addresses remain, the next address is obtained, or accessed, at step 186 and the process proceeds to step 174.

If at step 174, it is determined that the address is not an MSISDN, then the address is analyzed to determine if it is an email address at step 176. If the address is not an email address, the message can not be delivered and an optional error message is generated at step 178. If the address is an email address, it is sent as an email message at step 182. The destination can be an email address or an IP address. The message is routed to the IP address via an appropriate email server. The process then proceeds to step 184, and continues as described above.

While exemplary embodiments of PSCs have been described in connection with various computing devices, the underlying concepts may be applied to any computing device or system capable of managing memory.

The various techniques described herein may be implemented in connection with hardware or software or, where appropriate, with a combination of both. Thus, the methods and apparatus for implementing PSCs, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus for implementing PSCs may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While PSCs have been described in connection with exemplary embodiments of the various figures, it is to be understood that other similar embodiments can be used or modifications and additions can be made to the described embodiments for performing the same function of the present invention without deviating therefrom. For example, PSC users have been referred to as subscribers herein. However, PSCs are applicable to users, regardless as to whether a user is a subscriber. Therefore, PSCs should not be limited to any single embodiment, but rather should be construed in breadth and scope in accordance with the appended claims.

What is claimed:

1. A method for routing a message via a network, said method comprising:
    receiving said message comprising a personal short code (PSC) defined by a subscriber, said PSC associated with an action, wherein said action relates to at least one of a network service or a distribution, and wherein said network service is associated with a predetermined network short code, and wherein said distribution is associated with a distribution list;
    determining that said PSC is indicative of said network service or said distribution;
    when said PSC is determined to be indicative of said network service:
        translating said PSC to said predetermined network short code;
        transforming said message by replacing said PSC in said message with said predetermined network short code; and
        routing via said network said transformed message, said transformed message being indicative of said network service; and
    when said PSC is determined to be indicative of said distribution:
        mapping said PSC to said distribution list; and
        routing via said network a portion of said message to each destination of said distribution list.

2. A method in accordance with claim 1, wherein said message is received via a wireless network.

3. A method in accordance with claim 1, wherein said transformed message is routed to at least one of a subscriber service, and email server, an external short message entity (ESME), and an Internet.

4. A method in accordance with claim 3, wherein:
    said transformed message comprises a text portion;
    and said text portion is applicable to said subscriber service.

5. A method in accordance with claim 1, wherein said portion of said message comprises a text message.

6. A method in accordance with claim 1, wherein said distribution list comprises at least one of an email address, a web address, and a phone number.

7. A personal short code (PSC) processor comprising:
    a first portion for receiving a message comprising a PSC defined by a subscriber, said PSC associated with an action, wherein said action relates to at least one of a network service or a distribution, and wherein said network service is associated with a predetermined network short code, and wherein said distribution is associated with a distribution list;
    a second portion for:
        determining that said PSC is indicative of said network service or said distribution;
        translating said PSC to a predetermined network short code when said PSC is determined to be indicative of said predetermined network short code; and
        mapping said PSC to said distribution list when said PSC is determined to be indicative of said distribution list;
    a third portion for:
        transforming said message by replacing said PSC with said predetermined network short code if said PSC is determined to be indicative of said predetermined network short code; and
    a fourth portion for:
        transmitting to a network, said transformed message, when said PSC is determined to be indicative of said predetermined network short code, said transformed message being indicative of said network service; and
        routing via said network a portion of said message, when said PSC is determined to be indicative of said distribution, to each destination of said distribution list.

8. A PSC processor in accordance with claim 7, wherein said message is received via a wireless network.

9. A PSC processor in accordance with claim 7, wherein an intended destination of said transformed message is at least one of an external short message entity (ESME), an Internet, a subscriber service, and an email server.

10. A PSC processor in accordance with claim 9, wherein said transformed message comprises a text portion applicable to a service provided via said ESME.

11. A PSC processor in accordance with claim 7, wherein said portion of said message comprises a text message.

12. A PSC processor in accordance with claim 7, wherein said distribution list comprises at least one of an email address, a web address, and a phone number.

13. A PSC processor in accordance with claim 7, wherein:
said message is received from a wireless network via a gateway node;
said transformed message is routed via said gateway node to one of an external short message entity (ESME), an email server, a subscriber services node, and the Internet; and
said portion of said message is routed via said gateway node to each destination of said distribution list.

14. A computer readable medium, the computer readable medium not being a transient signal, the computer readable medium encoded with a computer program code for routing a message via a network, said program code comprising: a receive code segment for receiving said message comprising a personal short code (PSC) defined by a subscriber, said PSC associated with an action, wherein said action relates to at least one of a network service or a distribution, and wherein said network service is associated with a predetermined network short code, and wherein said distribution is associated with a distribution list; a determine code segment for determining when said PSC is indicative of said network service or said distribution; a translate code segment for translating said PSC to said predetermined network short code; a transform code segment for transforming said message by replacing said PSC in said message with said predetermined network short code; a route transformed message code segment for routing via said network said transformed message, said transformed message being indicative of said network service; a map code segment for mapping said PSC to said distribution list; and route portion code segment for routing via said network a portion of said message to each destination of said distribution list.

15. A computer readable medium in accordance with claim 14, wherein said message is received via a wireless network.

16. A computer readable medium in accordance with claim 15, wherein said transformed message is routed to at least one of a subscriber service, an Internet, an external short message entity (ESME), and an email server.

17. A computer readable medium in accordance with claim 14, wherein said transformed message comprises a text portion applicable to a service provided via said ESME.

18. A computer readable medium in accordance with claim 14, wherein said portion of said message comprises a text message.

19. A computer readable medium in accordance with claim 14, wherein said distribution list comprises at least one of an email address, a web address, and a phone number.

* * * * *